United States Patent [19]

Navone

[11] 4,319,835

[45] Mar. 16, 1982

[54] COPYING MACHINE WITH ORIGINAL CARRIAGE MOVING DEVICE

[75] Inventor: Lorenzo Navone, Turin, Italy

[73] Assignee: Ing. C. Olivetti & C., S.p.A, Ivrea, Italy

[21] Appl. No.: 128,819

[22] Filed: Mar. 10, 1980

[30] Foreign Application Priority Data

Mar. 14, 1979 [IT] Italy .............................. 67533 A/79

[51] Int. Cl.[3] ........................ G03B 27/48; G03B 27/50

[52] U.S. Cl. .......................................... 355/50; 271/3; 355/8

[58] Field of Search .................... 355/3 SH, 50, 51, 8, 355/14 R; 271/3

[56] References Cited

U.S. PATENT DOCUMENTS 3,900,256 8/1975 Ravera et al. .................... 355/14 R 4,239,371 12/1980 Igarishi et al. ...................... 355/384

*Primary Examiner*—Richard A. Wintercorn

*Attorney, Agent, or Firm*—W. R. Hulbert

[57] ABSTRACT

In a copying machine having a movable carriage 5 for carrying the original, the correct velocity ratio between the carriage and the drive shaft 18 which advances the photosensitive sheet 21 (or photosensitive drum) is established by driving the carriage from a shaft 25 at overspeed through a friction clutch 38 and limiting the carriage velocity to the correct value by a coupling (rack 32, gears 40,43, one-way clutch 29) between the carriage 5 and the drive shaft 18. The correct velocity is thereby maintained irrespective of wear and tolerances in the drive to the carriage and the carriage guides.

5 Claims, 1 Drawing Figure

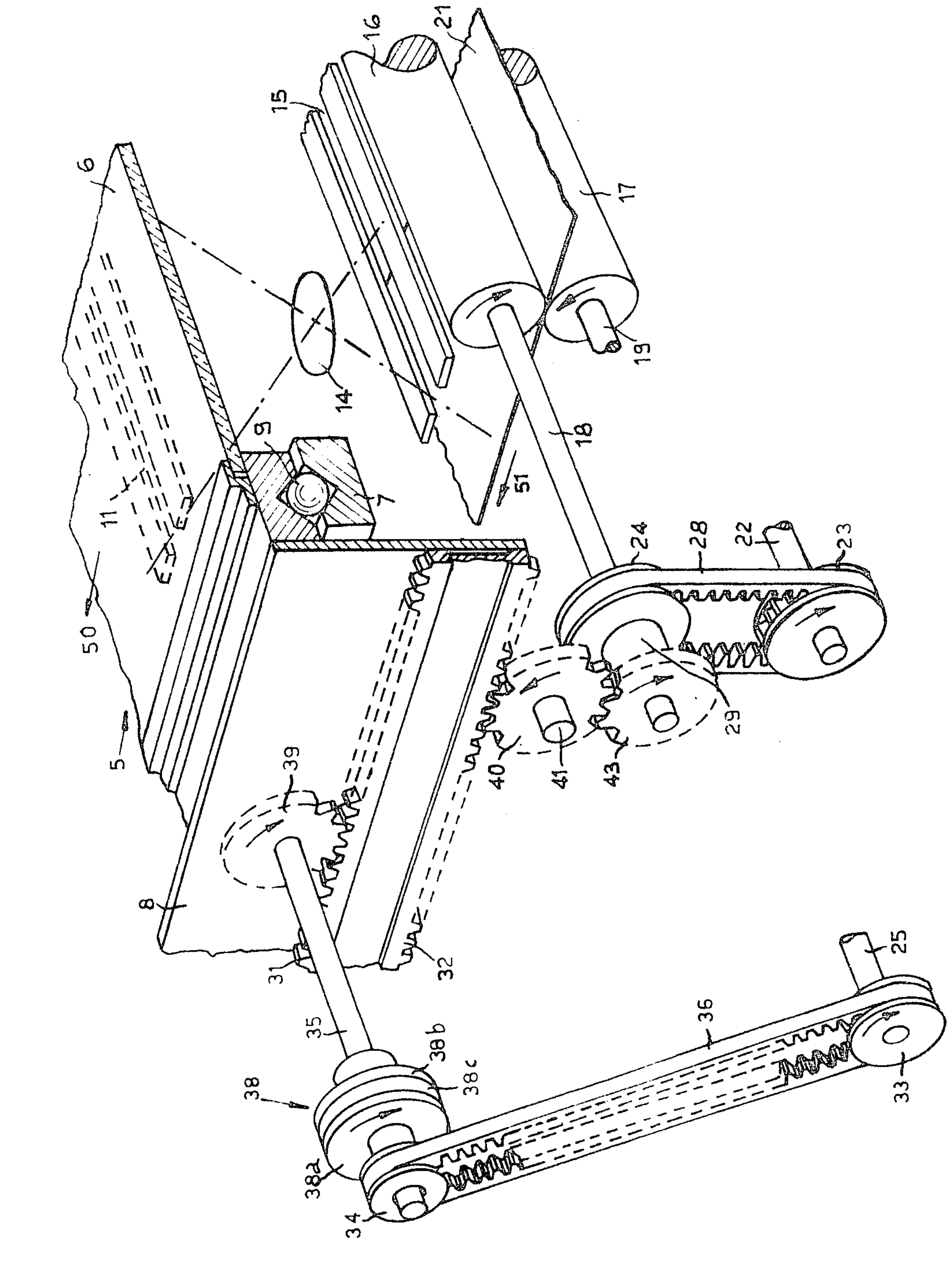
5
6
7
8
9
11
14
15
16
17
18
19
21
22
23
24
25
28
29
31
32
33
34
35
36
38
38a
38b
38c
39
40
41
43
50
51

COPYING MACHINE WITH ORIGINAL CARRIAGE MOVING DEVICE

BACKGROUND OF THE INVENTION

1. Field of the invention.

The present invention relates to a copying machine with a device for imparting motion to the carriage carrying the original, in particular, to a device for establishing the correct velocity of the carriage.

2. Description of the prior art

It is known, for example from U.S. Pat. No. 3,900,256, for the original which is to be reproduced to be located on a carriage having a transparent plane surface, which is transported over a scanning slit arranged transversely with respect to the motion of the carriage, so that a transverse strip of the original is illuminated. The corresponding image is transmitted through a fixed optical system which is located below and adjacent to this slit on to a photo-sensitive element which is moved at a velocity substantially equal to, or is kept at a constant ratio with respect to the velocity of the carriage.

The photosensitive element may be a cylinder having a photoconducting layer on its outer surface which is electrostatically charged and on which the latent electrostatic image is formed, to be developed and transferred onto a copy of page of plan paper, or the copy sheet itself may have one face coated with a photoconducting material which is electrostatically charged and, after exposure to the image of the original, carries a latent image which is developed using developing powder or liquid and fixed on the copy sheet, as is known in the Electrofax copying process.

Whatever the type of process used and consequently the type of photo-sensitive element used, copying machines which employ a movable carriage do suffer from the disadvantage that whilst the motion of the photosensitive element is taking place, at a constant velocity, at least during exposure to the luminous image, the velocity of motion of the carriage is not constant to the same degree, both as a result of play in the parts providing for transmission and conversion of the rotational movement of a drive shaft to a translatory motion of the carriage, and a result of play, wear, and irregularities in the guides on which the carriage slides.

Strict constancy of the velocity ratio between the carriage and the photo-sensitive element is absolutely essential in order to ensure that the image of the original is transferred to the photo-sensitive element without any geometrical distortion.

Electronic control systems for providing constancy of the carriage velocity suffer from the disadvantage of being too expensive, all the more so because the use of a movable carriage for transporting the original is a characteristic of less expensive copying machines, namely those machines which fall in the medium to low price range of the market for reprographic machinery.

SUMMARY OF THE INVENTION

The object of the invention is consequently to provide a copying machine comprising a drive element for advancing a photo-sensitive element at a first constant velocity in an exposure region, and a carriage for transporting the original at a second constant velocity along a scanning path, whereby the image of the original is transferred on to the photo-sensitive element. The invention is characterized by carriage drive means tending to drive the carriage at a velocity exceeding the second velocity, a coupling between the carriage and drive element limiting the velocity of the carriage to the second velocity, and a device allowing slip in the carriage drive means.

The invention will be further described, by way of non-limiting example, with reference to the accompanying drawings which is a perspective view of the synchronizing device employed in an electrophotographic copying machine.

DETAILED DESCRIPTION OF THE PREFERRED EMBODIMENT

In the drawing, the carriage 5 carrying the original is slidable on ball-bearings 9 on guides 7 which are fixed to the frame 8 of the copying machine. For semplicity the term carriage is used herein to denote the member which carries and moves the original, regardless of whether the path of movement is rectilinear or not. The transparent illuminating surface 6, an illuminating window 11 is provided, through which a strip of the original is illuminated and the image of the strip is focused, using an optical system 14 which is shown diagrammatically in the drawing, on to an exposure window 15. Below and adjacent to the exposure window 15, a pair of drive rollers 16, 17 on shafts 18 and 19 is designed to advance a copy sheet 21 having its upper face coated with a photoconducting material. The image of the strip of original is projected through the exposure window 15 on to the sheet 21 and, after subsequent developing and fixing, the finished copy of the original is produced, as is known for example from the Electrofax copying process which is described in the U.S. Pat. No. 3,900,256 mentioned above.

The roller 16 is driven from a drive shaft 22 via a toothed wheel 23 on the shaft 22, a toothed wheel 24 on shaft 18 and a toothed belt 28 which couples the two wheels 23 and 24.

The carriage 5 has racks 31 and 32 rigidly fixed to it. Using rack 31, the carriage has its translatory motion imparted to it from a drive shaft 25 via a toothed wheel 33 on the shaft 25, a toothed wheel 34 which is free to rotate on a shaft 35 and is coupled to the wheel 33 by a toothed belt 36, a friction clutch 38 of known type designed to transmit the motion of the wheel 34 to the shaft 35 by virtue of friction coupling between the disc **38*a* which is rigidly fixed to the wheel 34 and the disc 38*b* which is rigidly fixed to shaft 35, an intermediate clutch plate 38*c* being located between the two discs, and a toothed wheel 39 on the shaft 35 and which engages with the rack 31**.

During the exposure of the copy sheet to the image of the original via the illuminating window 11 with the optical system 14 and the exposure window 15, in which the carriage is caused to advance in the direction of arrow 50 and the copy sheet 21 is caused to advance in the direction of arrow 51, the drive shafts 22 and 25 rotate in the same clockwise sense and at the same angular velocity, whilst the diameters and the tooth numbers of the toothed wheels are such that the rectilinear velocity imparted to the carriage 5 is slightly greater than the peripheral velocity of the drive roller 16. By way of example, the wheels 23, 24 and 33 may have the same diameter and the same number of teeth $Z=14$, while the wheel 34 has a smaller number of teeth $Z=13$ and the wheel 39 has the same effective diameter as the roller 16, as a result of which if VO is the peripheral velocity of the roller 16 then VI=(14/13) VO is the velocity of translation of the carriage 5, assuming that there is no slipping between the discs 38*a* and 38*b* of the clutch device 38.

However, a toothed wheel 43 is further provided, which is free to rotate on shaft 18 and is identical in diameter and tooth number to the wheel 39, and this is coupled to the rack 32 by means of idler wheel 40, which is free to rotate on a shaft 41. The rack 32 consequently imparts, during the exposure stage, an anticlockwise rotation at a peripheral velocity equal to that of the carriage 5, to the wheel 43.

The wheel 43 has a device 29 fixed to it which provides unidirectional transmission of the motion between the wheel 43 and the shaft 18; such a device is known as a one-way clutch or a free-wheel. The device 29 connects the wheel 43 to the shaft 18 when the wheel 43 rotates clockwise and this prevents the wheel 43 from having a peripheral velocity of rotation which is greater than the velocity VO of the roller 16. On the other hand, the device 29 allows the wheel 43 to idle on shaft 18 when the wheel 43 rotates anticlockwise.

Consequently, during the exposure stage, the effect of the one-way clutch device 29 is to cause the wheel 43 to brake the motion of the carriage 5 and keep its velocity down to the value VO. There is consequently continuous slip between the disc 38*a* which is driven at a velocity VI=(14/13) VO and disc 38*b* which is driven, as a result of the limiting action referred to above, at the velocity VO. Consequently, any possible variations in velocity in the transmission of drive to the carriage, as a result of the causes mentioned above, are compensated for and are reflected in greater or lesser slip between the discs 38*a* and 38*b* of the clutch device 38, whilst the carriage maintains a velocity of translation which is substantially constant and equal to the value VO.

At the end of the exposure stage, when the copy sheet has left the exposure region and is no longer engaged between rollers 16 and 17, the rotation of the drive shaft 25 is reversed and the velocity of rotation is trebled as a result of which there is rapid travel of the carriage in the reverse direction from the arrow 50 until the rest position is reached, the wheel 43 now rotating freely on the shaft 18 so that there is substantially no slip between the discs 38*a* and 38*b* of the clutch device 38.

In one modification of the device described above, the shaft 18 may carry a photoconducting drum as is used in electrophotographic copying machines using plain paper, in place of a drive roller for a copy sheet of coated paper, the image of the original being developed on the drum for subsequent transfer on to a sheet of plain paper.

According to another modification, the various parts constituting the transmission could be dimensioned in such a way as to maintain the velocity of the carriage during the exposure stage at a constant ratio with respect to the velocity of the photo-sensitive element, rather than at a velocity which is equal to it, so as to provide for enlargement or reduction of the copy with respect to the original.

The device described above is not limited to use in the field of electrophotography but can be used in fields of photocopying where there is a problem of keeping constant the relationship between the velocity of the original and that of a photo-sensitive element.

I claim:

1. A copying machine comprising a drive element for advancing a photo sensitive-element at a first constant velocity in an exposure region, a carriage for transporting the original at a second constant velocity along a scanning path, whereby the image of the original is transferred onto the photo sensitive element, carriage drive means capable of transmitting a force to said carriage sufficient to drive said carriage at a velocity exceeding said second velocity, coupling means arranged between said carriage and said drive element for limiting the velocity of said carriage to said second velocity, and friction means for allowing slip in the carriage drive means.

2. Copying machine according to claim 1, wherein said friction means is a friction clutch.

3. A copying machine according to claim 2, wherein said first and second velocities are equal.

4. A copying machine according to claim 3, wherein said drive element carries a drive roller having a constant peripheral velocity for advancing a photo-sensitive copy sheet.

5. A copying machine according to claim 4, wherein said coupling means comprises a rack which is fixed to said carriage, said gear element which rotates coaxially with respect to said drive element and is driven by the motion of said rack at an angular velocity which corresponds to the velocity of said rack, and a unidirectional clutch arranged between said rotating gear element and said drive element.

* * * * *